(12) United States Patent
Yang

(10) Patent No.: US 9,120,437 B2
(45) Date of Patent: Sep. 1, 2015

(54) VEHICLE COMPONENT CONTROL

(71) Applicant: KT CORPORATION, Gyeonggi-do (KR)

(72) Inventor: Jeong-Yeop Yang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/191,756

(22) Filed: Feb. 27, 2014

(65) Prior Publication Data

US 2014/0244069 A1    Aug. 28, 2014

(30) Foreign Application Priority Data

Feb. 27, 2013 (KR) ........................ 10-2013-0020830

(51) Int. Cl.
| | |
|---|---|
| G05D 1/00 | (2006.01) |
| G05D 3/00 | (2006.01) |
| G06F 7/00 | (2006.01) |
| G01C 23/00 | (2006.01) |
| B60R 16/023 | (2006.01) |

(52) U.S. Cl.
CPC ................................. B60R 16/0231 (2013.01)

(58) Field of Classification Search
CPC .................................................. B60R 16/0231
USPC ........................................................... 701/1
See application file for complete search history.

(56) References Cited

U.S. PATENT DOCUMENTS

| | | |
|---|---|---|
| 7,660,406 B2 | 2/2010 | Fama et al. |
| 7,971,139 B2 | 6/2011 | Stanciu et al. |
| 8,032,780 B2 | 10/2011 | Koh et al. |
| 8,112,506 B2 | 2/2012 | Son et al. |
| 8,180,379 B2 | 5/2012 | Forstall et al. |
| 8,797,464 B2 | 8/2014 | Kim et al. |
| 8,813,195 B2 | 8/2014 | Wen et al. |
| 2004/0170262 A1 | 9/2004 | Ohno |
| 2005/0152380 A1 | 7/2005 | Lee et al. |
| 2007/0130280 A1 | 6/2007 | Park et al. |
| 2007/0214262 A1 | 9/2007 | Buchbinder et al. |
| 2008/0271123 A1 | 10/2008 | Ollis et al. |
| 2010/0042720 A1 | 2/2010 | Stienhans et al. |
| 2010/0210317 A1 | 8/2010 | Kakehi |
| 2011/0106279 A1 | 5/2011 | Cho et al. |
| 2011/0287748 A1 | 11/2011 | Angel et al. |
| 2012/0065797 A1 | 3/2012 | Brian et al. |
| 2012/0179547 A1 | 7/2012 | Besore et al. |
| 2012/0209916 A1 | 8/2012 | Azuma et al. |
| 2013/0060358 A1 | 3/2013 | Li et al. |

(Continued)

FOREIGN PATENT DOCUMENTS

| | | |
|---|---|---|
| JP | 11-184660 A | 7/1999 |
| JP | 2005-340881 A | 12/2005 |

(Continued)

*Primary Examiner* — Maceeh Anwari

(74) *Attorney, Agent, or Firm* — IP Legal Services, LLC

(57) ABSTRACT

Described embodiments provide a device controlling at least one of components of a vehicle in response to a control command from user equipment. The device may be configured to assign a first control level and a control state to each component of the vehicle, to assign a second control level to user equipment, and to allow the user equipment to control a target component of the vehicle when a first control level of the target component is equivalent to a second control level of the user equipment and a control state of the target component is equivalent to a state of the vehicle.

18 Claims, 7 Drawing Sheets

(56) References Cited

U.S. PATENT DOCUMENTS

| | | |
|---|---|---|
| 2013/0147954 A1 | 6/2013 | Song et al. |
| 2013/0179593 A1 | 7/2013 | Dunlap et al. |
| 2013/0239205 A1 | 9/2013 | Jacobs et al. |
| 2013/0289752 A1 | 10/2013 | Orsat et al. |
| 2014/0215043 A1 | 7/2014 | Ryu et al. |
| 2014/0267907 A1 | 9/2014 | Downes et al. |
| 2014/0304385 A1 | 10/2014 | Lee et al. |
| 2014/0359675 A1 | 12/2014 | Mank |
| 2015/0055640 A1 | 2/2015 | Wang et al. |

FOREIGN PATENT DOCUMENTS

| | | |
|---|---|---|
| KR | 10-1997-0057199 A | 7/1997 |
| KR | 10-2005-0049773 A | 5/2005 |
| KR | 10-2005-0062896 A | 6/2005 |
| KR | 10-2005-0073015 A | 7/2005 |
| KR | 10-2006-0008679 A | 1/2006 |
| KR | 10-2007-0058977 A | 6/2007 |
| KR | 10-2008-0051040 A | 6/2008 |
| KR | 10-2008-0096239 A | 10/2008 |
| KR | 10-2009-0030393 A | 3/2009 |
| KR | 10-2009-0118424 A | 11/2009 |
| KR | 10-2011-0009338 A | 1/2011 |
| KR | 10-2011-0047764 A | 5/2011 |
| KR | 10-2011-0059479 A | 6/2011 |
| KR | 10-2011-0066000 A | 6/2011 |
| KR | 10-2011-0066001 A | 6/2011 |
| KR | 10-1052074 B1 | 7/2011 |
| KR | 10-2012-0139777 A | 12/2012 |
| KR | 10-2013-0066829 A | 6/2013 |

FIG. 3

User Database — 341

| User Identity | User Equipment Identification Number | Control Level |
|---|---|---|
| Host | XXX001 | 0 |
| Guest 1 | XXX002 | 1 |
| Guest 2 | XXX003 | 2 |

Component Database — 342

| Component Identity | Control Level | Control State |
|---|---|---|
| Audio system | 2 | Null |
| DVD player | 2 | Stop Only |
| Air-Conditioning | 2 | Null |
| Front Light | 1 | Null |
| Door Lock | 0 | Stop Only |
| Brake | 1 | Driving Only |
| . | . | . |
| . | . | . |
| . | . | . |

342-1, 342-2, 342-3

VEHICLE COMPONENT CONTROL

CROSS REFERENCE TO PRIOR APPLICATIONS

The present application claims priority under 35 U.S.C. §119 to Korean Patent Application No. 10-2013-0020830 (filed on Feb. 27, 2013), which is hereby incorporated by reference in its entirety.

The subject matter of this application is related to U.S. patent application Ser. No. 14/172,118 filed on Feb. 4, 2014, the teachings of which is incorporated herein their entirety by reference.

BACKGROUND OF THE INVENTION

The present disclosure relates to controlling vehicle components through user equipment. A driver is a person who has the most control over components in a vehicle. In general, a driver controls such vehicle components while driving a vehicle. Such multitasking operation of the driver may be cumbersome and raise safety issues.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present disclosure overcome the above disadvantages and other disadvantages not described above. Also, the present invention is not required to overcome the disadvantages described above, and an embodiment of the present invention may not overcome any of the problems described above.

In accordance with one aspect of the present invention, a passenger may be allowed to control at least one of vehicle components through user equipment.

In accordance with at least one embodiment a method may be provided for controlling at least one of components of a vehicle by a vehicle control device. The method may include assigning a first control level and a control state to each component of the vehicle, assigning a second control level to user equipment, and allowing the user equipment to control a target component of the vehicle when a first control level assigned to the target component is equivalent to a second control level assigned to the user equipment and a control state assigned with the target component is equivalent to a state of the vehicle.

The assigning a first control level and a control state may include requesting component information from each component in the vehicle, determining a control level and a control state based on the requested component information of a corresponding component, and assigning the determined control level, as the first control state, and the determined control state to the corresponding component. The method may further include storing information on the assigned first control state, the assigned control state, and a corresponding component in a component database.

The control level is one of integer numbers within a predetermined range. The method may include allowing the user equipment to control components assigned with a first control level equal to and higher than a second control level assigned to the user equipment.

The control state may be one of driving states of the vehicle. The method may include allowing the user equipment to control the target component when the control state assigned to the target component indicates a driving state of the vehicle.

The assigning a second control level may include receiving a registration request from the user equipment, determining a control level of the user equipment based on information included in the registration request, and assigning the determined control level to the user equipment as the second control level. The method may further include storing information on the assigned control level in a user database in connection with user information and user terminal identification information.

The allowing the user equipment to control a target component of the vehicle may include detecting presence of the user equipment, searching a user database of the vehicle control unit for user information associated with the user equipment upon detection of the user equipment, obtaining component control information associated with the detected user terminal from a component database, and transmitting the obtained component control information to the user equipment and initiation a component control session between the user equipment and the vehicle control unit. The method may further include performing a registration process for obtaining and storing information on the user equipment when user information associated with the user equipment is not stored in the user database.

The component control information may include information on a list of components controllable to the user equipment. The controllable components may be components assigned with a first control level equal to and higher than a second control level assigned to the user equipment.

The allowing the user equipment to control a target component of the vehicle may include receiving a control command from the user equipment, determining a target component to control, a first control level assigned to the target component, a control state assigned to the target component, and a second control level assigned to the user equipment based on a user database, a component database, and information included in the control command, determining whether the first control level of the target component is equivalent to the second control level of the user equipment and whether the control state assigned to the target component is equivalent to a driving state of the vehicle, and transmitting a control signal to the target component when the first control level is equivalent to the second control level and the control state is equivalent to the driving state. The method may further include transmitting a denial message to the user equipment at least one of when the first control level is not equivalent to the second control level and when the control state is not equivalent to the driving state.

In accordance with at least one embodiment, a device may control at least one of components of a vehicle in response to a control command from user equipment. The device is configured to assign a first control level and a control state to each component of the vehicle, to assign a second control level to user equipment, and to allow the user equipment to control a target component of the vehicle when a first control level of the target component is equivalent to a second control level of the user equipment and a control state of the target component is equivalent to a state of the vehicle.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 3 illustrates information stored a user database in accordance with at least one embodiment;

FIG. 4 illustrates information stored in a component database in accordance with at least one embodiment;

DETAILED DESCRIPTION OF THE INVENTION

Figure 1:
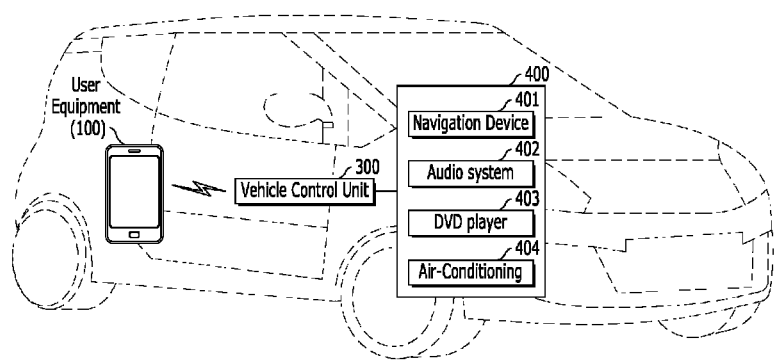
FIG. 1 illustrates a system for enabling a passenger to control at least one component of a vehicle in accordance with at least one embodiment.

Reference will now be made in detail to embodiments of the present disclosure, examples of which are illustrated in the accompanying drawings, wherein like reference numerals refer to like elements throughout. The embodiments are described below, in order to explain the present disclosure by referring to the figures.

In accordance with at least one embodiment, a passenger of a vehicle may be allowed to control at least one of vehicle components through user equipment by assigning a predetermined control level matched with a passenger. Hereinafter, overall operation for enabling a passenger to control vehicle component will be described with reference to FIG. 1.

FIG. 1 illustrates a system for enabling a passenger to control at least one vehicle component in accordance with at least one embodiment.

Referring to FIG. 1, a vehicle may include various electric components 400 including navigation device 401, audio system 402, digital versatile disc (DVD) player 403, air-conditioner 404, door locks, power windows, and interior lights. In order to control such vehicle components 400, a vehicle may include vehicle control unit 300. Vehicle control unit 300 may control components 400 directly or indirectly through an engine control module (ECM) or an electronic control unit (ECU) in response to a control command received from a user.

User equipment 100 may be a portable electronic device having processing power with a memory and capable of communicating with vehicle control unit 300. For example, user equipment 100 may include a personal computer (PC), a smartphone, a laptop computer, a personal digital assistance (PDA), and a portable multimedia player (PMP), a pad-like device, and a tablet personal computer (PC), but the present invention is not limited thereto.

In accordance with at least one embodiment, vehicle control unit 300 may enable user equipment 100 to control at least one of components 400. For example, vehicle control unit 300 may receive a user registration request from user equipment 100. In response to the user registration request, vehicle control unit 300 may register user equipment 100 as a control device for at least one of vehicle components and assign a control level matched with to user equipment 100. After registration, user equipment 100 may send a control command to vehicle control unit 300 for controlling at least one of components 400 assigned to user equipment 100 based on the corresponding control level.

Figure 2:
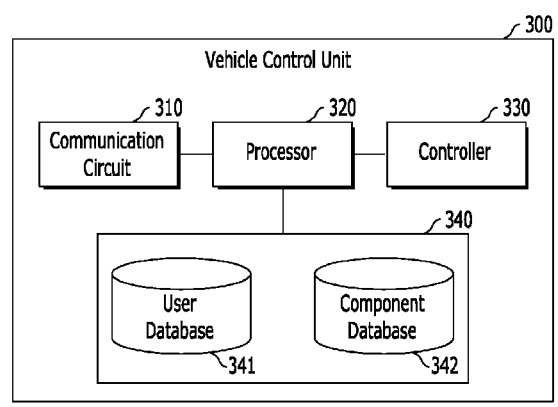
FIG. 2 is a block diagram illustrating a vehicle control unit in accordance with at least one embodiment.

FIG. 2 illustrates a vehicle control unit in accordance with at least one embodiment.

Referring to FIG. 2, vehicle control unit 300 may include communication circuit 310, processor 320, controller 330, and memory 340. Communication circuit 310 may transmit signals to and receive signals from other entities (e.g., user equipment 100). For example, communication circuit 310 may establish a communication link with user equipment 100 and communicate with user equipment 100 based on various types of communication schemes, such as through a personal area wireless communication network, a short range communication network, and/or a wired communication network. The communication link may be established using Wi-Fi, Zigbee, Bluetooth, and/or control area network (CAN), but the present invention is not limited thereto. Communication circuit 310 may be referred to as a transceiver and include at least one of a mobile communication circuit, a wireless internet circuit, a global positioning signal receiving circuit, and so forth. Particularly, communication circuit 310 may include various types of short distance communication circuitries such as circuitries for near field communication (NFC), Bluetooth communication, radio frequency identification (RFID) communication, infrared data communication, and acoustic communication.

Processor 320 may control overall operations of the constituent elements of vehicle control unit 300. Particularly, processor 320 may perform operations necessary for driving the constituent elements of vehicle control unit 300 upon generation of a predetermined event. For example, processor 320 may perform operations for delivering a control command to controller 300. The control command may be received from user equipment 100 and may include information on user instructions for operating at least one of components 400. Processor 320 may receive the control command from user equipment 100 through communication circuit 310 and may deliver the control command to controller 330.

Controller 330 may perform operations for instructing components 400 in accordance with the control command received from user equipment 100. For example, controller 330 may receive the control command from processor 320 and may instruct at least one of components 400 to operate according to the control command. In FIG. 2, controller 330 is illustrated as an independent element from processor 320, but the present invention is not limited thereto. Controller 330 may be integrated with processor 320.

Memory 340 may a data storage device of vehicle control unit 300. Memory 340 may store various types of information necessary for enabling user equipment 100 to control components 400. Memory 340 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

In accordance with at least one embodiment, memory 340 may include user database 341 and component database 342. User database 341 may store information on a user (e.g., passenger) and corresponding user equipment (e.g., user equipment 100). Such a user may be a user registered for controlling at least one of vehicle components 400 or a user that previously accessed vehicle control unit 300 and controlled at least one of components 400. Component database 342 may store a list of vehicle components in a vehicle and a control level assigned to each one of component 400. The present disclosure, however, is not limited thereto.

FIG. 3 illustrates information stored in a user database in accordance with at least one embodiment.

Referring to FIG. 3, user database 341 may store user information in different categories, such as user identity 341-1, user equipment identification number 341-2, and control level 341-3. User identity 341-1 may be a type of a user sending a command control. For example, such a user type may include a host or a guest. User equipment identification number 341-2 may denote device identification (e.g., device ID) of corresponding user equipment transmitting the control command to vehicle control unit 300. Control level 341-3 may indicate a control level assigned to corresponding user equipment or a user.

For example, user database 341 shows that user equipment having a user equipment identification number "XXX001" is classified as a host type device and assigned with a control level 0. The control level 0 may be defined to allow corresponding user equipment to control all of components 400. User equipment having a user equipment identification number "XXX002" is classified as a guest 1 and assigned with a control level "1" which may be defined to allow corresponding user equipment to control a first set of components 400. The first set of components may be components not affecting driving a vehicle. The first set of components for the control level 1 will be described with reference to FIG. 4. User equipment having a user equipment identification number "XXX003" is classified as a guest 2 and assigned with a control level "2" which may be defined to allow corresponding user equipment to control a second set of components 400. Such a second set of components may be components relating to an entertainment system of the vehicle, but the present invention is not limited thereto. The entertainment system may include an audio system and/or a DVD player.

Such a control level may represent a group of components 400 which may be allocated to corresponding user equipment based on a user type such as a host, a guest 1, or a guest 2. For example, the control level 0 may be assigned to a host for allowing controlling all of components 400. The control level 1 may be assigned to a guest 1 for allowing controlling a part of components not affecting driving or the control level 2 may be assigned a guest 2 for allowing controlling a part of components related to an entertainment system. Particularly, the control level 0 may be assigned to a driver, the control level 1 may be assigned to a spouse of the driver, and the control level 2 may be assigned to children of the driver.

A group of components corresponding to each control level may be defined based on various factors, characteristics, and safety issues. For example, components related to providing a power to the vehicle may be grouped and assigned with the control level "0." Components related to providing assistance to a driver for driving a vehicle may be grouped and assigned with the control level "1." Components related to the entertainment system may be grouped and assigned with control level "2." Such a group may be determined by at least one of a system design, a manufacturer, and a user.

FIG. 4 illustrates information stored in a component database in accordance with at least one embodiment.

Referring to FIG. 4, component database 350 may store information on components 400 in different categories, such as component identification 342-1, control level 342-2, and/or control state 342-3. Component identification 342-1 may denote identification of each component in a vehicle. Control level 342-2 may be a control level assigned to each component. Control state 342-3 may include a control state assigned to each component.

For example, component database 342 of FIG. 4 shows that an audio system is assigned with a control level 2 and a control state "null." That is, such an audio system assigned with the control level 2 may be controlled by user equipment assigned with the control level 2 or a control level higher than the control level 2, which may be the control level 0 and the control level 1. A component assigned with the control state "null" may be controlled at any time regardless whether a vehicle is moving or is at stop. Thus, user equipment assigned with the control level 2, 1, or 0 may control the audio system at any time.

Component database 342 of FIG. 4 also shows that a door lock is assigned with a control level 0 and a control state "stop only." That is, a component assigned with the control level 0 may be controlled by user equipment assigned with the control level 0. A component assigned with the control state "stop only" may be controlled when the vehicle is at stop. Thus, user equipment assigned with the control level 0 may only control the door lock when the vehicle is at stop.

A brake is assigned with a control level 1 and a control state "driving only." Such a component assigned with the control level 1 may be controlled by user equipment assigned with the control level 1 or a control level higher than the control level 1, which is a control level 0. A component assigned with the control state "driving only" may be controlled when the vehicle is moving. Thus, user equipment assigned with the control level 1 or 0 may control the brake while the vehicle is moving.

Figure 5:
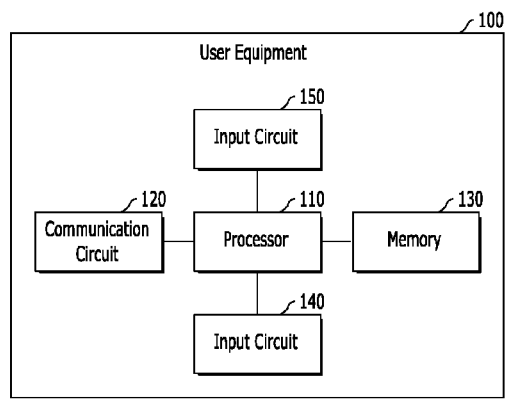
FIG. 5 illustrates user equipment in accordance with at least one embodiment.

FIG. 5 illustrates user equipment in accordance with at least one embodiment.

Referring to FIG. 5, user equipment 100 may include controller 110, communication circuit 120, memory 130, input circuit 140, and display 150. Controller 110 may control overall operation of the constituent elements of user equipment 100. Particularly, processor 110 may perform operations necessary for driving the constituent elements of user equipment 100 in response to inputs received from a related user or upon generation of predetermined events. Controller 110 may perform operation for transmitting a control command to vehicle control unit 300 and providing a control interface to a user.

Communication circuit 120 may perform operations for communicating with vehicle control unit 300. For example, communication circuit 120 may establish a communication link with vehicle control unit 300 via a personal area wireless communication network, a short range communication network, and/or a wired communication network. The communication link may be established using Wi-Fi, Zigbee, Bluetooth, and/or control area network (CAN).

Communication circuit 120 may be referred to as a transceiver and include at least one of a mobile communication circuit, a wireless internet circuit, a global positioning signal receiving circuit, and so forth. Particularly, communication circuit 310 may include various types of short distance communication circuitries such as circuitries for near field communication (NFC), Bluetooth communication, radio frequency identification (RFID) communication, infrared data communication, and acoustic communication.

Memory 130 may be a data storage device of user equipment 100. Memory 130 may store information necessary for operating user equipment 100 and performing certain operations requested by a user. Such information may include any software programs and related data. Memory 130 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. For example, memory 130 store information for controlling various types of components in a target vehicle. Memory 130 may store component information received from vehicle control unit 300.

Input circuit 140 may be a user interface for receiving input (e.g., user commands) from a user. Input unit 140 may be realized in various types. For example, input circuit 140 may include a touch screen, a keyboard and/or a keypad, a mouse device and/or a touchpad. Input circuit 140 may further include a dome switch, a jog wheel, and a jog switch, but is not limited thereto. Particularly, with respect to the touch screen, user equipment 140 may be a full touch type smart phone. In this case, input circuit 140 may include several hardware key buttons and a touch screen. The hardware key buttons may include a hold key and a volume control button. The touch screen may be disposed on an upper surface of output circuit 150, but the present invention is not limited thereto. In accordance with at least one embodiment, input circuit 140 may receive an input for controlling components 400 from a user.

Display 150 may be an output device for visually displaying information. For example, display 150 may display image data (i.e., icons and information) produced or processed by controller 110. Display 150 may receive the image data from controller 110 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as "App". Also, the image data may further include still images and moving images, produced or processed by controller 110. For example, display 150 may be a liquid crystal display (LCD) panel or an active-matrix organic light-emitting diode (AMOLED) panel, but the present invention is not limited thereto. In accordance with at least one embodiment, display 150 may display a control interface showing a list of components of a target vehicle based on information received from vehicle control unit 300.

Figure 6:
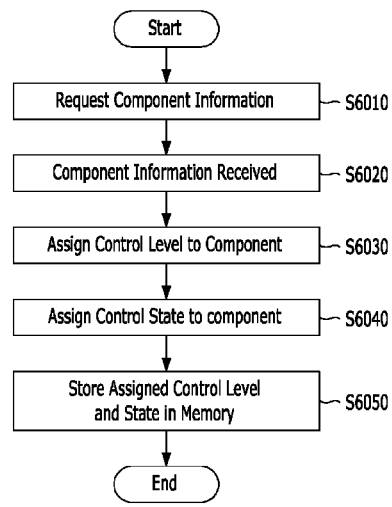
FIG. 6 illustrates steps for obtaining component information and assigning a control level and a control state to a component in accordance with at least one embodiment.

FIG. 6 illustrates assigning a control level and a control state to each component of a vehicle in accordance with at least one embodiment.

At step S6010, vehicle control unit 300 may send a component information request to each component (e.g., navigation device) in a vehicle. The component information may include a component identification number, controllable elements, and associated control parameters, but the present disclosure is not limited thereto.

At step S6020, vehicle control unit 300 may receive the component information from each component in response to the component information request. For example, component unit 300 may receive the component information from each one of component 401. In another embodiment, the component information may be obtained from a database stored in user equipment 100 or vehicle control unit 300. For example, vehicle control unit 300 may send a request to the database for the component information.

At step S6030, vehicle control unit 300 may assign a control level to each component. The control level may represent a particular level of control required to control a corresponding component. For example, a component assigned with a particular control level may be controlled by a user who has been assigned with the same control level. A component assigned with a control level 0 may be controlled by a user assigned with a control level 0.

In another embodiment, a component assigned with a particular control level may be controlled by a user assigned with a control level higher than or equal to the control level of the component. For example, the component assigned with a control level 2 may be controlled by a user assigned with a control level 1 or a control level 0.

Vehicle control unit 300 may refer to a predetermined control level standard to assign a control level to each component. Such a control level standard may be defined by a manufacturer, a group of users, or an organization. Such a control level standard may be used to define a group of components that can be controlled by each user type (e.g., a host, a guest 1, a guest 2) and stored in vehicle control unit 300, but the present invention is not limited thereto. Such policy or standard may be downloaded from a related server and used or updated when it is necessary.

In accordance with at least one embodiment, vehicle control unit 300 may receive component information from component 401. Vehicle control unit 300 may use the component information to assign a control level to component 401 based on the control level standard. For example, vehicle control unit 300 may use the component information to determine whether a component needs to be controlled by either a driver alone or a driver and a passenger.

At step S6040, vehicle control unit 300 may assign a control state to each component. Each component assigned with a particular control state may only be controlled when a vehicle is in the particular control state. Furthermore, a user may be denied for controlling a component assigned with the same control level when a control state assigned to the component contradicts a current state of the vehicle. For example, a component assigned with a control state "stop only" may only be controlled when the vehicle is at stop, regardless of which control level has been assigned to the component or which control level a user has been assigned with for a purpose of controlling the component.

The control state may be assigned in accordance with a control state standard. The control state standard may be defined by at least one of a manufacturer, a group of users, and an organization. The control state standard may be used to separate components into different control states. For example, vehicle control unit 300 may assign the components with "driving only," "stop only," and "null" states. Components assigned with the "driving only" state may only be controlled when the vehicle is moving. Components assigned with "stop only" state may only be controlled when the vehicle is at stop. Components assigned with the "null" state may be controlled regardless of whether the vehicle is at stop or moving.

In accordance with at least one embodiment, vehicle control unit 300 may receive component information from each component. Vehicle control unit 300 may use the component information to determine which control state needs to be assigned to a corresponding component based on the control state standards. For example, vehicle control unit may use the component information to determine whether a component (e.g., navigation device) needs to be controlled only when the vehicle is at stop. The present disclosure, however, is not limited thereto.

At step 6050, the assigned control level and the assigned control state may be stored in component database 342. For example, a control level and a control state assigned to each component may be stored in component database 342 in mapping with each component.

The operations for obtaining the component information, assigning the control level, and assigning the control state (e.g. S6010 to S6050) may be repeated until all of components are assigned with a corresponding control level or control state.

Figure 7:
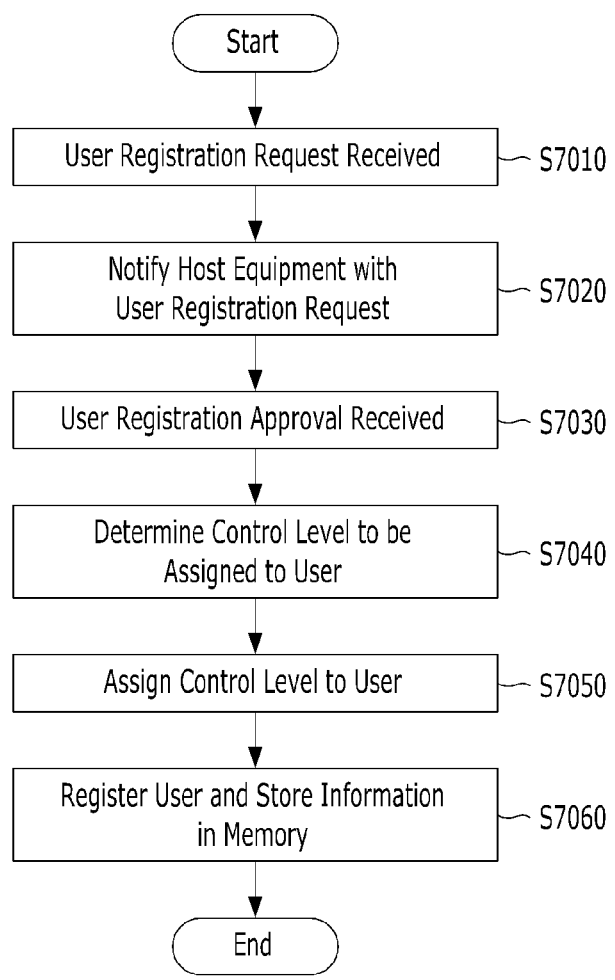
FIG. 7 illustrates steps for registering and assigning a control level to user equipment in accordance with at least one embodiment.

FIG. 7 illustrates registering and assigning a control level to user equipment in accordance with at least one embodiment.

At step S7010, vehicle control unit 300 may receive a user registration request. For example, vehicle control unit 300 may receive the user registration request directly from user equipment 100. The user registration request may include information on user equipment 100. For example, the user registration request may include user information, a user equipment identification number and a phone number associated with user equipment 100.

Alternatively, the user registration request may be initiated by either vehicle control unit 300 or a host device. For example, vehicle control unit 300 or a host device may recognize a presence of user equipment 100 in a vehicle and may trigger the user registration request. In this embodiment, a host device may be a navigation device or an entertainment device mounted in the vehicle. The present disclosure, however, is not limited thereto.

At step S7020, vehicle control unit 300 may notify the host device. For example, vehicle control unit 300 may notify the host device that the user registration request is received. Additionally, vehicle control unit 300 may send the information received from user equipment 100 to the host device.

Alternatively, vehicle control unit 300 may determine whether the information received from user equipment 100 has been previously received, registered, and stored. For example, vehicle control unit 300 may search user database 431 for any previously stored information.

At step S7030, vehicle control unit 300 may receive an approval of the user registration request. For example, the host device may approve or deny the user registration request in response to a user input and may send the result to vehicle control unit 300. When the user registration request is initiated by either vehicle control unit 300 or the host device, the approval may not be necessary. The present disclosure, however, is not limited thereto.

At step S7040, vehicle control unit 300 may determine a control level for a requested user. For example, based on the information received from user equipment 100, vehicle control unit 300 may determine control levels to assign to the requested user.

In accordance with at least one embodiment, vehicle control unit 300 may notify the host device with available control levels. The available control levels may be control levels assigned to the components in FIG. 6. For example, when there are three different control levels assigned to the components, vehicle control unit 300 may notify the three available control levels to the host device. The host device may notify vehicle control unit 300 with a control level that needs to be assigned to the requested user.

At step S7050, vehicle control unit 300 may assign the control level to the requested user. For example, vehicle control unit 300 may receive the control level to be assigned to the requested user from the host device and may assign the control level to the requested user.

In accordance with at least one embodiment, vehicle control unit 300 may assign a default control level to the requested user. The default control level may be a control level which has been predetermined to be assigned to user equipment requesting a user registration. For example, vehicle control unit 300 may use the information received from user equipment 100 and may assign the default control level.

At step S7060, vehicle control unit 300 may register user equipment 100 and may store information on user equipment 100 on user database 341. The information on user equipment 100 may include user information, a user equipment identification number, a phone number associated with user equipment 100, and a control level assigned to user equipment 100.

Once the user registration is completed, vehicle control unit 300 may notify user equipment 100. Additionally, vehicle control unit 300 may transmit user registration information to an external server, such as component control management server.

Figure 8:
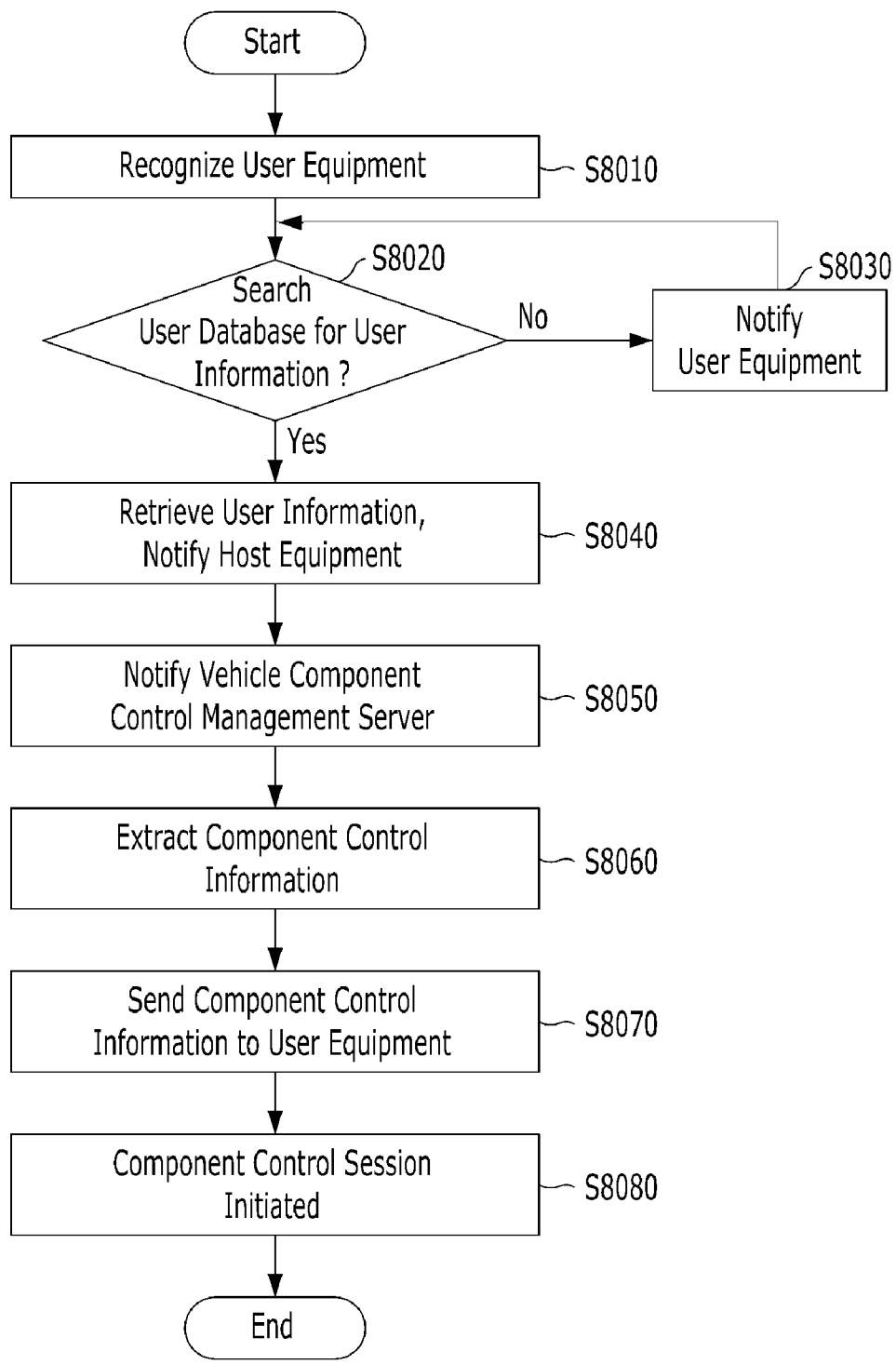
FIG. 8 illustrates steps initiating a component control session in accordance with at least one embodiment.

FIG. 8 illustrates steps initiating a component control session in accordance with at least one embodiment.

At step 8010, vehicle control unit 300 may recognize a presence of user equipment 100. The presence of user equipment 100 may be recognized by when vehicle control unit 300 communicates with processor 110 via communication circuit 120 in user equipment 100. For example, vehicle control unit 300 may recognize the presence of user equipment 100 when a Bluetooth paring is established between vehicle control unit 300 and user equipment 100.

Vehicle control unit 300 may receive, in addition to recognizing the presence of user equipment 100, information on user equipment 100. The information on user equipment may include user information, a user equipment identification number, and/or a phone number associated with user equipment 100. The present invention, however, is not limited thereto.

Alternatively, the presence of user equipment 100 may be recognized when user equipment sends a request to vehicle control unit 300 for a user registration. When the user registration request is received, vehicle control unit 300 may proceed to register user equipment. The user registration is described above in reference to FIG. 7.

At step 8020, vehicle control unit 300 may search user database 341 for corresponding user information. The corresponding user information may be information on user equipment 100 stored in user database 341 during the user registration. The corresponding user information may include user information, a user equipment identification number, a phone number associated with user equipment 100, and/or a control level assigned to user equipment 100. For example, vehicle control unit 300 may use the information received from user equipment 100 to determine whether recognized user equipment 100 has been registered and the corresponding user information has been stored in user database 341.

At step S8030, when the corresponding user information is not found in user database 341, vehicle control unit 300 may proceed to register recognized user equipment 100. For example, vehicle control unit 300 may notify recognized user equipment 100 and may prompt recognized user equipment 100 for the user registration. Steps for the user registration are described above in reference to FIG. 7.

At step 8040, vehicle control unit 300 may retrieve the corresponding user information when vehicle control unit 300 finds the corresponding user information in user database 341. Vehicle control unit 300 may notify a host device. For example, vehicle control unit 300 may notify a host device that recognized user equipment 200 has been registered previously and may send the corresponding user information to a host device.

The host device may be given an option to approve or disapprove recognized user equipment 100. For example, the host device may approve vehicle control unit 300 to proceed to a next step. Or, the host device may disapprove vehicle control unit 300 from proceeding to a next step. The present disclosure, however, is not limited thereto.

At step 8050, vehicle control unit 300 may notify a component control management server. For example, vehicle control unit 300 may notify the component control management server that recognized user equipment 100 has been registered previously and may send the corresponding user information to the component control management server.

At step 8060, vehicle control unit 300 may extract component control information from component database 342. The component control information may include a list of components. The list of component may include a group of components assigned with control levels lower or equal to a control level assigned to user equipment 100. For example, vehicle control unit 300 may obtain a control level assigned to user equipment 100 from user database 341. Vehicle control unit 300 may extract a list of components assigned with control levels equal to or lower than the control level assigned to user equipment 100.

The component control information may further include control parameters associated with the components extracted from component database 342. The control parameters may be controllable features of a corresponding component. For example, the control parameter for navigation device 401 may be "on" and "off."

At step 8070, vehicle control unit 300 may transmit the component control information to user equipment 100. For example, vehicle control unit 300 may notify user equipment 100 with a list of components assigned to user equipment 100 to operate. The list of component may include a group of components assigned with control levels equal to or lower than a control level assigned with user equipment 100.

At step 8080, a component control session may be initiated. The component control session may be initiated between user equipment 100 and vehicle control unit 300 for operating the components. Processor (e.g., Vehicle control agent) 110 may produce and display a control interface on user equipment 100. The control interface may be a graphic user interface displaying the list of components received from vehicle control unit 300. Additionally, the control interface may further display the control parameters associated with the components.

Figure 9:
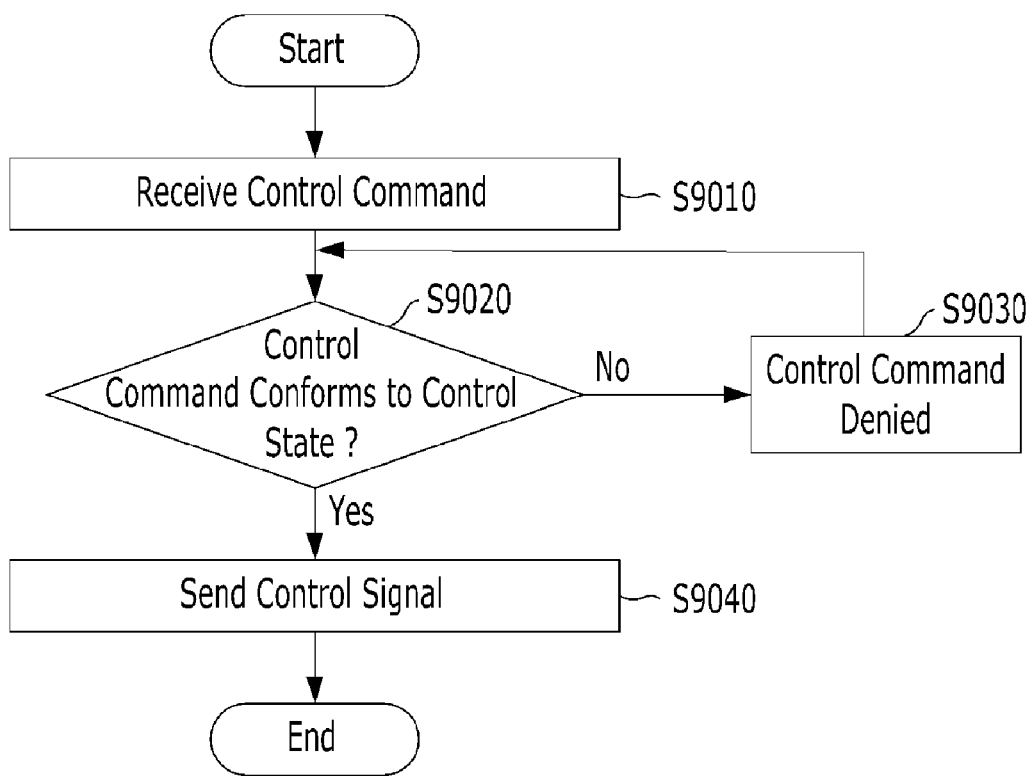
FIG. 9 illustrates steps controlling a component with user equipment in accordance with at least one embodiment.

FIG. 9 illustrates controlling components with user equipment in accordance with at least one embodiment.

At step 9010, vehicle control unit 300 may receive a control command from user equipment 100. The control command may be an input received on user equipment 100. For example, the control interface on user equipment 100 may display the list of the components and the control parameters associated with the components. A user may provide an input as to how to control the components based on corresponding control parameters. Vehicle control unit 300 may receive the input from the user as a control command. For example, the user may provide the control command to turn "on" or "off" navigation device 401.

In accordance with at least one embodiment, a host device may receive the control command. For example, the host device may receive the control command on how to control a component (e.g., navigation device 401) from user equipment 100. The host device may transmit the control command to vehicle control unit 300. The present disclosure, however, is not limited thereto.

At step 9020, vehicle control unit 300 may determine whether to approve or decline the control command. The control command may be approved when the control state assigned to an associated component conforms to a current state of the vehicle. For example, only if the vehicle is not moving or at stop, vehicle control unit 300 approves a control command for controlling a component assigned with a control state "stop only".

Vehicle control unit 300 may not approve when the control state of an associated component does not conforms to the current state of the vehicle. For example, vehicle control unit 300 may not approve the control command on the component assigned with the control state "stop only" if the vehicle is moving.

At step 9030, vehicle control unit 300 may notify user equipment 100 that the control command is denied. For example, vehicle control unit 300 may send a message to user equipment 100 explaining that the control command is denied because the control state assigned to the component does not conform to the current state of the vehicle.

At step 9040, vehicle control unit 300 may send a control signal to the component. The control signal may be an electronic signal controlling the component to perform operation based on the control command. For example, when the control state assigned to component 401 conforms to the current state of the vehicle, vehicle control unit 300 may send the control signal to navigation device 401.

Such a controlling method may be applied to various situations. For example, a passenger in a back seat may adjust an audio system, change a channel on a radio, and/or adjust a temperature of an air-conditioner without receiving assistance from a driver. Additionally, the passenger may assist an inexperienced driver by controlling an emergency light, a headlight, a fog light and/or an operation of a windshield wiper. Additionally, a passenger riding in a public transportation, such taxi, may input a destination to a navigation device through a smartphone. Furthermore, information on the passenger may be transmitted to an external server to secure passenger's safety in case of an emergency.

Figure 10:
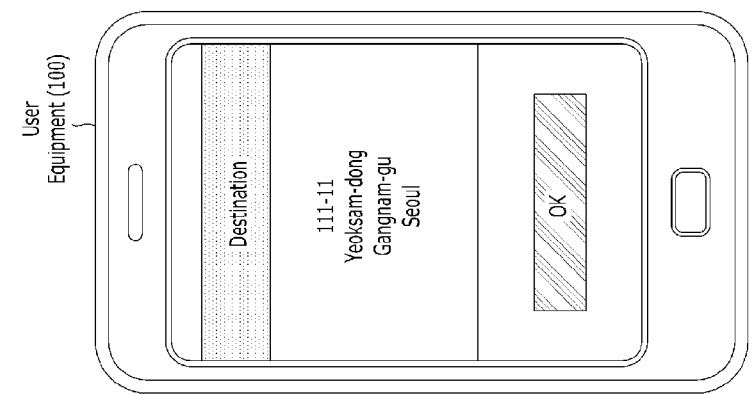
FIG. 10, FIG. 11, and FIG. 12 illustrate controlling a component with user equipment in accordance with at least one embodiment.
Figure 11:
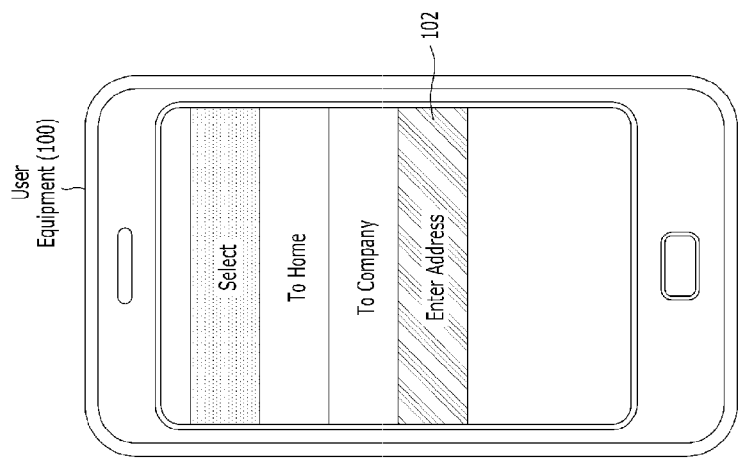
Figure 12:
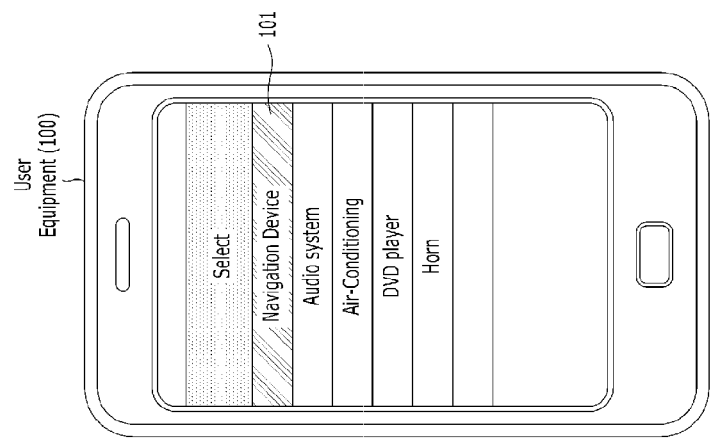

FIG. 10, FIG. 11, and FIG. 12 illustrate an exemplary graphic user interface controlling a component of a vehicle through user equipment in accordance with at least one embodiment.

Referring to FIG. 10, user equipment 100 may display a control interface showing a list of components which can be controlled. The list of components may be received from vehicle control unit 300 or may have been stored in user equipment 100 through a prior use. Alternatively, user equipment 100 may display all components and highlight only components which are allowed to control. For example, user equipment 100 may display components including navigation device 101, an audio system, an air-condition device, a DVD player, and/or a horn. User equipment 100 may then only highlight navigation device 101 indicating that rests of components displayed on user equipment 100 are not currently allowed to control. A user may then select navigation device 101.

Referring to FIG. 11, once the user selects navigation device 101, a different control interface may be provided to the user for a further selection. For example, user equipment 100 may display "to home", "to company", and/or "enter address". The user may then select "enter address" 102.

Referring to FIG. 12, once the user selects "enter address" 102, another control interface may be provided to the user for entering an address. The user may enter the address on use equipment 100. The address entered on user equipment 100 may then be delivered to an actual navigation device through vehicle control unit 300. The navigation device in a vehicle may find a route and guide the user to the address.

Such operation may be applied to a different situation. More particular, when certain components deteriorate, malfunctions, or breaks down, user equipment 100 may replace the malfunctioned components. For example, a GPS device of user equipment 100 may be incorporated with a navigation device of a vehicle. When the navigation device of the vehicle is malfunctioned, user equipment 100 may transmit location information in real time to the navigation device in the vehicle. The navigation device of the vehicle may use the location information received from user equipment 100 to display a current location of the vehicle. Similarly, user equipment 100 may transmit traffic information to the navigation device of the vehicle. The navigation device may then use the traffic information received from user equipment 100 to find a faster route to a destination.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling, by a vehicle control device, at least one of components of a vehicle in response to a control command from user equipment, the method comprising:

assigning a first control level and a control state to each component of the vehicle;

assigning a second control level to user equipment; and allowing the user equipment to control a target component of the vehicle when a first control level assigned to the target component is equivalent to a second control level assigned to the user equipment and a control state assigned with the target component is equivalent to a state of the vehicle, wherein the allowing the user equipment to control a target component of the vehicle includes:

receiving a control command from the user equipment;

determining a target component to control, a first control level assigned to the target component, a control state assigned to the target component, and a second control level assigned to the user equipment based on a user database, a component database, and information included in the control command;
determining whether the first control level of the target component is equivalent to the second control level of the user equipment and whether the control state assigned to the target component is equivalent to a driving state of the vehicle; and
transmitting a control signal to the target component when the first control level is equivalent to the second control level and the control state is equivalent to the driving state.

2. The method of claim 1, wherein the assigning a first control level and a control state includes:
requesting component information from each component in the vehicle;
determining a control level and a control state based on the requested component information of a corresponding component; and
assigning the determined control level, as the first control state, and the determined control state to the corresponding component.

3. The method of claim 2, further comprising:
storing information on the assigned first control state, the assigned control state, and a corresponding component in a component database.

4. The method of claim 2, wherein the control level is one of integer numbers within a predetermined range.

5. The method of claim 4, comprising:
allowing the user equipment to control components assigned with a first control level equal to and higher than a second control level assigned to the user equipment.

6. The method of claim 1, wherein the control state is one of driving states of the vehicle.

7. The method of claim 6, comprising:
allowing the user equipment to control the target component when the control state assigned to the target component indicates a driving state of the vehicle.

8. The method of claim 1, wherein the assigning a second control level includes:
receiving a registration request from the user equipment;
determining a control level of the user equipment based on information included in the registration request; and
assigning the determined control level to the user equipment as the second control level.

9. The method of claim 8, comprising:
storing information on the assigned control level in a user database in connection with user information and user terminal identification information.

10. The method of claim 1, wherein the allowing the user equipment to control a target component of the vehicle includes:
detecting presence of the user equipment;
searching a user database of the vehicle control unit for user information associated with the user equipment upon detection of the user equipment;
obtaining component control information associated with the detected user terminal from a component database; and
transmitting the obtained component control information to the user equipment and initiating a component control session between the user equipment and the vehicle control unit.

11. The method of claim 10, comprising:
performing a registration process for obtaining and storing information on the user equipment when user information associated with the user equipment is not stored in the user database.

12. The method of claim 10, wherein the component control information includes information on a list of components controllable to the user equipment.

13. The method of claim 12, wherein the controllable components are components assigned with a first control level equal to and higher than a second control level assigned to the user equipment.

14. The method of claim 1, comprising:
transmitting a denial message to the user equipment at least one of when the first control level is not equivalent to the second control level and when the control state is not equivalent to the driving state.

15. A device of controlling at least one of components of a vehicle in response to a control command from user equipment, the device is configured to:
assign a first control level and a control state to each component of the vehicle;
assign a second control level to user equipment; and
allow the user equipment to control a target component of the vehicle when a first control level of the target component is equivalent to a second control level of the user equipment and a control state of the target component is equivalent to a state of the vehicle,
wherein the device is configured to:
receive a control command from the user equipment;
determine a target component to control, a first control level assigned to the target component, a control state assigned to the target component, and a second control level assigned to the user equipment based on a user database, a component database, and information included in the control command;
determine whether the first control level of the target component is equivalent to the second control level of the user equipment and whether the control state assigned to the target component is equivalent to a driving state of the vehicle; and
transmit a control signal to the target component when the first control level is equivalent to the second control level and the control state is equivalent to the driving state.

16. The device of claim 15, wherein the device is configured to:
request component information from a component in the vehicle;
determine a control level and a control state based on the requested component information of the component;
assign the determined control level, as the first control state, and the determined control state to the component; and
store information on the assigned first control state, the assigned control state, and a corresponding component in a component database.

17. The device of claim 15, wherein the device is configured to:
receive a registration request from the user equipment;
determine a control level of the user equipment based on information included in the registration request;
assign the determined control level to the user equipment as the second control level; and
store information on the assigned control level in a user database in connection with user information and user terminal identification information.

18. The device of claim 15, wherein the device is configured to: detect presence of the user equipment;
- search a user database of the vehicle control unit for user information associated with the user equipment upon detection of the user equipment;
- obtain component control information associated with the detected user terminal from a component database;
- transmit the obtained component control information to the user equipment and initiating a component control session between the user equipment and the vehicle control unit; and
- perform a registration process for obtaining and storing information on the user equipment when user information associated with the user equipment is not stored in the user database.

* * * * *